April 2, 1940.  J. SISHC  2,195,471
BEET LOADER
Filed May 24, 1937  2 Sheets-Sheet 1
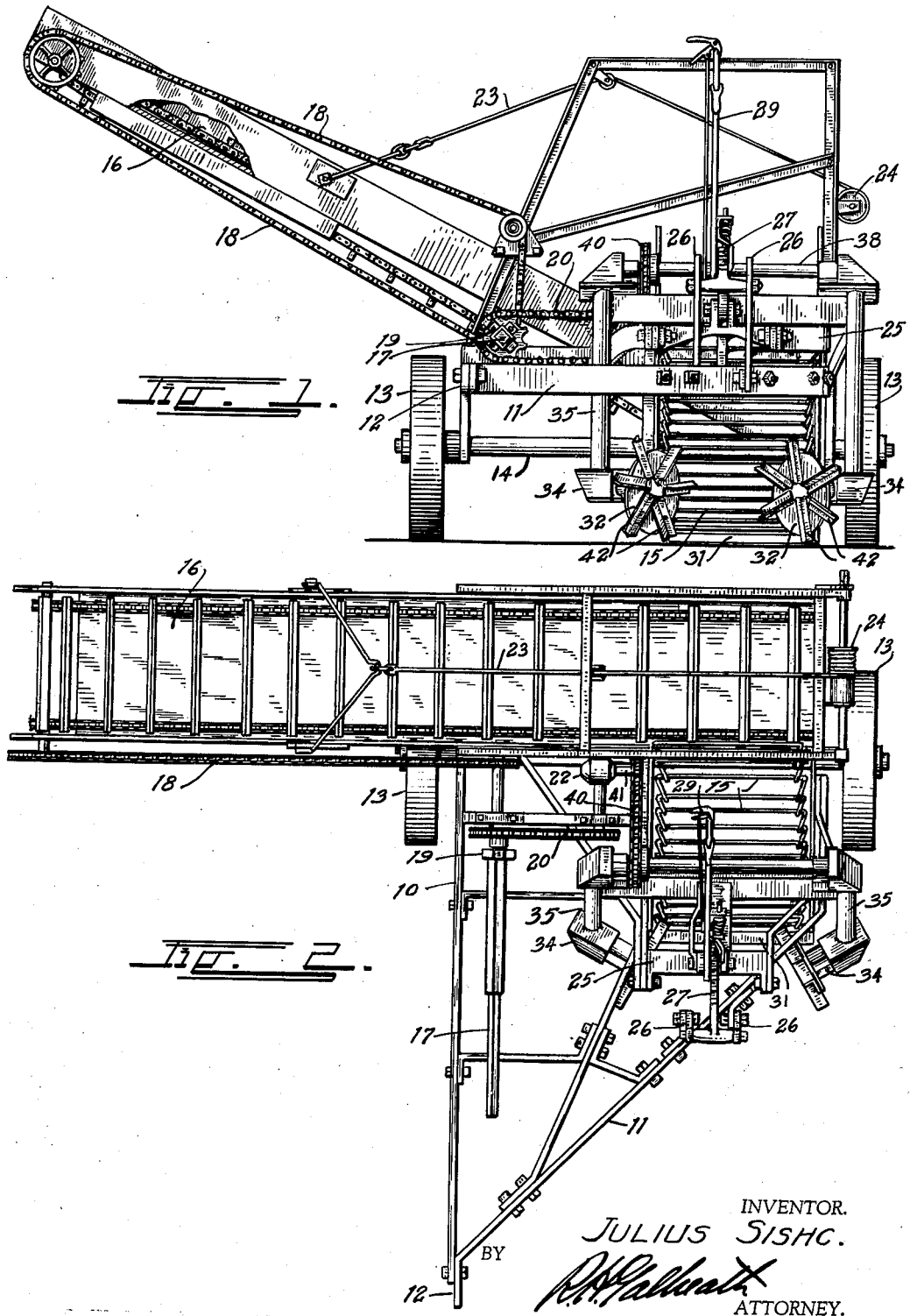
INVENTOR.
JULIUS SISHC.
BY
ATTORNEY.

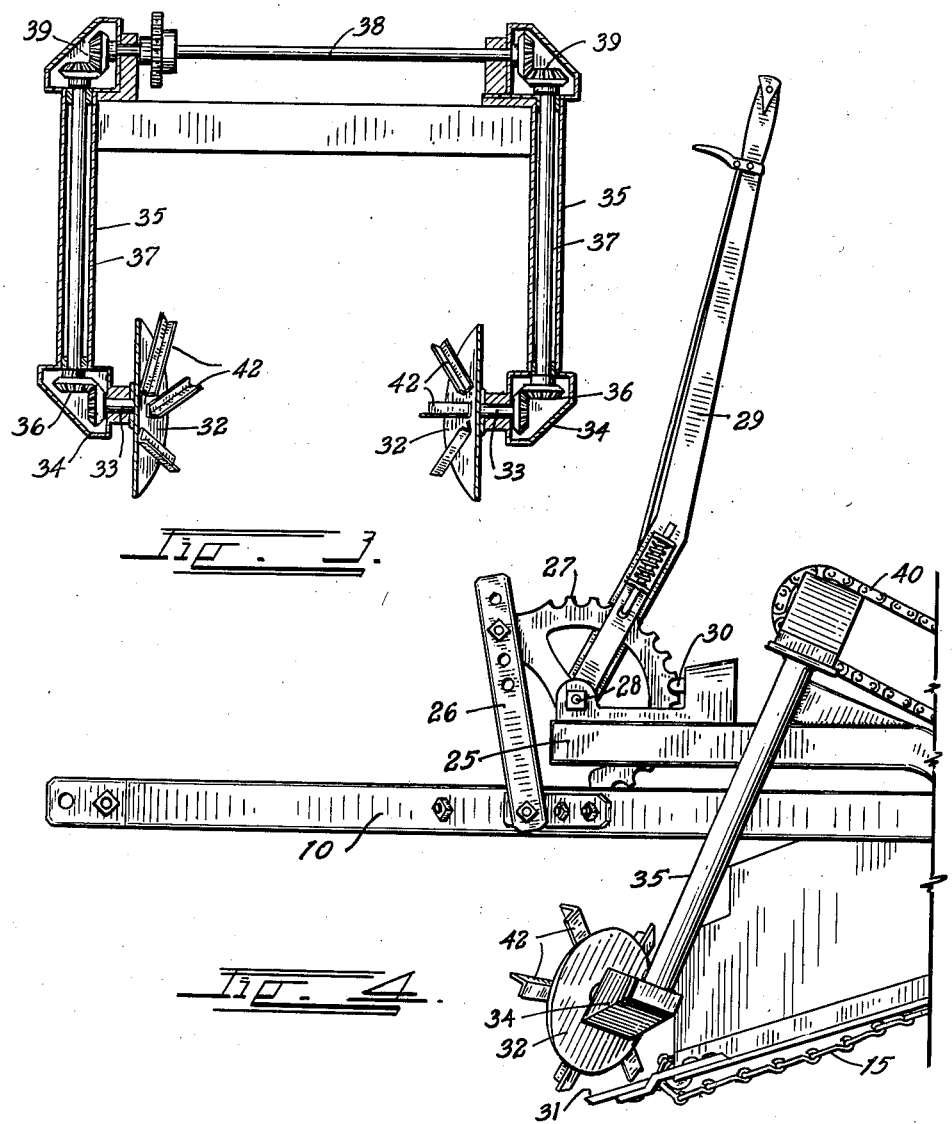

Patented Apr. 2, 1940

2,195,471

UNITED STATES PATENT OFFICE 2,195,471

BEET LOADER

Julius Sishc, Torrington, Wyo.

Application May 24, 1937, Serial No. 144,396

4 Claims. (Cl. 198—9)

This invention relates to a loading machine and while particularly designed for loading sugar beets, potatoes, and the like from field piles, it is of course not limited to this particular use. The invention is designed to provide a more efficient gathering mechanism and a more efficient tractor hitch than that illustrated in applicant's prior Patent No. 1,902,383.

The principal object of the invention is to provide a highly efficient portable loading machine which can be drawn along a pile of beets and which will gather the beets and feed them onto an elevator to deliver them to trucks traveling with the machine.

Another object of the invention is to so construct the machine that it will accurately travel in line with the pile while being drawn from a tractor traveling to one side of the pile.

A further object is to provide a highly efficient gathering mechanism which will collect the scattered beets at each side of the pile and deliver them to the central elevator and which will not be effected by clods, rocks, sticks, and other debris.

Other objects and advantages reside in the detail construction of the invention, which is designed for simplicity, economy, and efficiency. These will become more apparent from the following description.

In the following detailed description of the invention reference is had to the accompanying drawings which form a part thereof. Like numerals refer to like parts in all views of the drawings and throughout the description.

In the drawings:

Fig. 1 is a front view of the improved loader.

Fig. 2 is a plan view thereof.

Fig. 3 is a detail sectional view of the gathering mechanism.

Fig. 4 is a detail side view of one of the gathering wheels and the heighth adjusting lever.

The invention employs a main frame 10, the right side of which extends straight forward and the left side of which, indicated at 11, is turned at an angle to extend to the right side, terminating in a draw bar 12, which is substantially in alignment with one side of the frame 10. The frame is supported upon an axle 14 carried in suitable wheels 13 so that the machine may be drawn along the field pile by means of a tractor or team.

It is desired to call attention to the fact that it is drawn from one side only. The truss-like effect of the angle portion 11 carries the other side forwardly so that the wheel axle remains at right angles to the line of travel.

At the opposite side of the frame 10 from the draw bar 12 a bar elevator 15 is carried. The elevator 15 discharges onto a conveyor 16, the discharge extremity of which is elevated to one side of the frame 10 so that it may be discharged into a truck traveling alongside of the loader. The elevator and the conveyor are driven from a power shaft 17 which extends forwardly from a universal joint 19 to the usual connection with the tractor engine.

The power shaft drives the conveyor 16 through the medium of a drive chain 18 from the power shaft 17. The elevator 15 is driven through the medium of a drive chain 20 which receives its power from the power shaft 17, and delivers it to the upper sprocket shaft of the elevator through the medium of a bevel gear set 22. The delivery extremity of the conveyor 16 is suspended on a cable 23 extending from a cable drum 24 so that its height can be varied.

The power transmission mechanism and the elevator are supported on a hinged frame 25, the rearward extremity of which is pivoted on the wheel axle 14 and the forward extremity of which is supported upon links 26 extending upwardly from the main frame 10. The links 26 connect to a toothed sector 27 which is pivoted at 28 on the frame 25. The sector 27 can be rotated by means of a jack lever 29, and is held in any desired adjusted position through the medium of a pawl 30.

It can be readily seen that if the sector 27 is rotated rearwardly, it will lower the forward extremity of the frame 25 relative to the frame 10, so as to lower the forward extremity of the elevator 15. The forward extremity of the latter is formed with an inclined gathering shoe 31 which scoops the beets upwardly onto the elevator.

Since the sides of the usual pile are irregular, and the beets somewhat scattered, some positive means must be provided for gathering the beets onto the elevator. This is accomplished in the present invention by means of a pair of rotating gathering wheels 32 positioned at each side of and ahead of the elevator.

The wheels 32 flare outwardly at the front so as to gather and sweep the beets inwardly onto the elevating chain. The wheels preferably consist of circular discs on the faces of which radially extending, angle-iron sweeps 42 are secured. The sweeps extend beyond the discs and act to sweep the beets inwardly and rearwardly onto the elevator. The discs are mounted upon the extremities of stub shafts 33, which are supported in bearing boxes 34 on the lower extremities of tubular leg members 35.

The shafts 33 are driven from bevel gears 36 and vertical shafts 37 which extend downwardly through the leg members 35. The upper extremities of both shafts 37 are driven from a cross shaft 38 through the medium of bevel gears 39. The cross shaft 38 is driven by means of a sprocket chain 40 from the upper elevator shaft 41.

The shafts 37 rotate the discs 32 in opposite directions. This rotation causes the lower edges of the discs to travel inwardly so as to sweep the beets inwardly onto the elevator and prevent piling or dragging.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A gathering mechanism for loading machines, of the type having a conveyor frame and an elevating chain mounted in said conveyor frame, comprising: a cross shaft extending across said frame over the forward extremity of said conveyor chain; a tubular leg member extending downwardly and forwardly from each extremity of said shaft; a bearing box carried on the lower extremity of each leg member; a gathering disc journalled on each bearing box; and means for transmitting power from said cross shaft through said tubular legs to rotate said gathering discs.

2. A gathering mechanism for loading machines, of the type having a conveyor frame and an elevating chain mounted in said conveyor frame, comprising: a cross shaft extending across said frame over the forward extremity of said conveyor chain; a tubular leg member extending downwardly and forwardly from each extremity of said shaft; a bearing box carried on the lower extremity of each leg member; a gathering disc journalled on each bearing box; a shaft rotatably mounted in each leg; an upper set of bevel gears at each extremity of said cross shaft for transmitting power to said rotatable shafts; and a second set of bevel gears in each bearing box for transmitting the power from each shaft to its gathering disc.

3. A gathering mechanism for loading machines, of the type having a conveyor frame and an elevating chain mounted in said conveyor frame, comprising: a cross shaft extending across said frame over the forward extremity of said conveyor chain; a tubular leg member extending downwardly and forwardly from each extremity of said shaft; a bearing box carried on the lower extremity of each leg member; a gathering disc journalled on each bearing box; angle-iron sweeps secured on the faces of said discs and extending radially outward beyond the periphery thereof; and means for transmitting power from said cross shaft through said tubular legs to rotate said gathering discs.

4. A gathering mechanism for loading machines, of the type having a conveyor frame and an elevating chain mounted in said conveyor frame, comprising: a cross shaft extending across said frame over the forward extremity of said conveyor chain; a tubular leg member extending downwardly and forwardly from each extremity of said shaft; a bearing box carried on the lower extremity of each leg member; a gathering disc journalled on each bearing box; angle-iron sweeps secured on the faces of said discs and extending radially outward beyond the periphery thereof; a shaft rotatably mounted in each leg; an upper set of bevel gears at each extremity of said cross shaft for transmitting power to said rotatable shafts; and a second set of bevel gears in each bearing box for transmitting the power from each vertical shaft to its gathering disc.

JULIUS SISHC.